(12) United States Patent
Li (10) Patent No.: US 10,641,007 B2
(45) Date of Patent: May 5, 2020

(54) ROTARY LOCKING MECHANISM, LOCK HAVING THE SAME, AND LOCKING CONTROL METHOD OF THE LOCK

(71) Applicant: Jichu Li, Hunan (CN)

(72) Inventor: Jichu Li, Hunan (CN)

( * ) Notice: Subject to any disclaimer, the term of this patent is extended or adjusted under 35 U.S.C. 154(b) by 64 days.

(21) Appl. No.: 15/813,132

(22) Filed: Nov. 14, 2017

(65) Prior Publication Data
US 2018/0155958 A1 Jun. 7, 2018

(30) Foreign Application Priority Data

Dec. 6, 2016 (CN) .......................... 2016 1 1110920

(51) Int. Cl.
*F16D 63/00* (2006.01)
*E05B 17/20* (2006.01)
(Continued)

(52) U.S. Cl.
CPC ........... *E05B 17/2088* (2013.01); *B62H 3/02* (2013.01); *B62H 5/148* (2013.01); *E05B 17/186* (2013.01);
(Continued)

(58) Field of Classification Search
CPC .......... B60T 1/005; B60T 1/062; B60T 1/067; F16D 63/006; F16D 63/3425;
(Continued)

(56) References Cited

U.S. PATENT DOCUMENTS 1,859,130 A * 5/1932 Dant ...................... B62H 5/148
70/226
2,030,599 A * 2/1936 Maurin .................. B62H 5/148
70/226
(Continued)

FOREIGN PATENT DOCUMENTS

CN 1288020 C 12/2006
CN 102695841 A 9/2012
(Continued)

OTHER PUBLICATIONS

First Office Action dated Aug. 20, 2018 for Taiwanese patent application No. 106140891, 4 pages, English summary provided by UNITALEN.
(Continued)

*Primary Examiner* — Bradley T King
*Assistant Examiner* — Stephen M Bowes
(74) *Attorney, Agent, or Firm* — Yue (Robert) Xu; Apex Attorneys at Law, LLP (57) ABSTRACT

A rotary locking mechanism and a lock applying the rotary locking mechanism and a locking control method are provided. A rotary output member is locked by a stable triangular supporting structure between the first locking member and the second locking member, the effective constraint of the second locking member on the first locking member applied by the first locking member in both a locked state and an unlocked state achieves locking and unlocking reliability of the product. The entire locking mechanism is
(Continued)

controlled by the same switching member. The false locking operation when the rotary member is operating is effectively avoided through the mechanical structure and the automatic control method. The entire rotary locking mechanism is enclosed and fixed in a shell of the lock, and can be applied to transmission machinery of bicycles, electric vehicles, motorcycles and even lightweight automobiles.

16 Claims, 6 Drawing Sheets

(51) Int. Cl.
    *E05B 17/18*     (2006.01)
    *B62H 3/02*     (2006.01)
    *E05B 47/00*     (2006.01)
    *B62H 5/14*     (2006.01)
    *E05B 71/00*     (2006.01)

(52) U.S. Cl.
    CPC .......... *E05B 47/0012* (2013.01); *E05B 71/00* (2013.01); *E05B 2047/0017* (2013.01)

(58) Field of Classification Search
    CPC .... F16H 63/3433; F16H 63/3416; B62L 5/18; B62L 1/00; B62H 5/14; B62H 5/148; A01K 89/012; A01K 89/017
    USPC ............ 188/189, 82.7, 69, 82.3, 82.34
    See application file for complete search history.

(56) References Cited

U.S. PATENT DOCUMENTS

| | | | | |
|---|---|---|---|---|
| 2,155,994 | A | | 4/1939 | Nielsen |
| 2,430,495 | A | * | 11/1947 | Dath ..................... B61H 13/04 188/82.3 |
| 3,126,166 | A | * | 3/1964 | Weinberg ............. A01K 89/017 242/250 |
| 5,388,777 | A | * | 2/1995 | Sugahara ........... A01K 89/0118 242/247 |
| 2002/0092720 | A1 | * | 7/2002 | Schafer ................... B60T 1/005 188/158 |
| 2011/0226709 | A1 | | 9/2011 | Yen et al. |
| 2015/0117935 | A1 | | 4/2015 | Chen |
| 2017/0088111 | A1 | * | 3/2017 | Kirchner ................ B60T 1/005 |
| 2017/0138474 | A1 | * | 5/2017 | Nomura ............. F16H 63/3425 |

FOREIGN PATENT DOCUMENTS

| | | | | |
|---|---|---|---|---|
| CN | 103174343 | A | 6/2013 | |
| DE | 375267 | C | 5/1923 | |
| DE | 102010038513 | A1 * | 2/2012 | ......... F16H 63/3425 |
| JP | 3380777 | B2 | 2/2003 | |
| JP | 3566233 | B2 | 9/2004 | |
| WO | 2011003407 | A1 | 1/2011 | |

OTHER PUBLICATIONS

Search Report dated Nov. 14, 2019 for European patent application No. 17878986.3, 10 pages.

* cited by examiner

ROTARY LOCKING MECHANISM, LOCK HAVING THE SAME, AND LOCKING CONTROL METHOD OF THE LOCK

CROSS-REFERENCE TO RELATED APPLICATION

This application claims the benefit of priority to Chinese patent application No. 201611110920.4 titled "ROTARY LOCKING MECHANISM, LOCK HAVING THE SAME, AND LOCKING CONTROL METHOD OF THE LOCK", filed with the Chinese State Intellectual Property Office on Dec. 6, 2016, the entire disclosure of which is incorporated herein by reference.

FIELD

The present application relates to the mechanical locking technique, and more particularly to a rotary locking mechanism, a lock having the rotary locking mechanism, and a locking control method of the lock.

BACKGROUND

Currently, most of locks for bicycles, electric vehicles, motorcycles and the like adopt a mechanical locking structure to lock wheels externally. Currently, there are various types of bicycle locks available on the market, including manually operated key locks and manually operated combination locks. With the popularity of public bicycle rental service, an electrically controlled public bicycle lock is developed, which also uses an external locking structure, and the external locking structure drives a corresponding locking member by an automatically controlled motor to lock a wheel.

This kind of external locking structure has a simple structure and is required to be equipped with a large number of external locking products, thus has a poor portability and a high cost. The external locking structure has a low locking reliability, is easy to be damaged, and has a high potential safety hazard. However, a dedicated bicycle rental station is relied on the site a lot, especially the bicycle sharing service developed recently. The model of bicycle sharing service aims to enable sharing and rental of public bicycle resources anytime and anywhere, this kind of public bicycle can hardly adopt a fixed-site rental, and it is necessary to use an on-board lock to achieve lock and unlock of the bicycle.

SUMMARY

The technical issue to be addressed by the present application is to provide a novel rotary locking mechanism, a lock having the rotary locking mechanism and a locking control method of the lock in view of the above deficiencies in the conventional locking devices for bicycles, electric vehicles, motorcycles and the like.

The present application is implemented with the following technical solutions.

A rotary locking mechanism includes a rotary output member, a first locking member, a second locking member and a switching member. The rotary output member is connected to a rotary member to realize rotation power transmission, the rotary output member and the rotary member connected to the rotary output member can be connected integrally, coaxially or via a transmission mechanism, and a rotation circumference of the rotary output member is provided with several locking grooves, and the locking grooves can be arranged in an outer circumference or an inner circumference of the rotation circumference. The first locking member and the second locking member are respectively elastically hinged at two hinge points, the first locking member is provided with a locking block which can be engaged in any one of the locking grooves, the second locking member and the first locking member abut against each other at a position outside a straight line in which the two hinge points are located, to allow the locking block of the first locking member to be engaged into the locking groove. The switching member is connected to a locking control system and has a first unlocking structure and a second unlocking structure which sequentially push the second locking member and the first locking member respectively.

Further, the first unlocking structure and the second unlocking structure include an unlocking block or an unlocking edge provided on each of the first locking member, the second locking member and the switching member, the unlocking block is protruding, and the unlocking edge is configured to make contact with the unlocking block.

Further, the first locking member and the second locking member abut against each other through a locking corner and a locking indentation coupled with each other.

Further, an unlocked-state maintaining structure is further provided between the first locking member and the second locking member.

Further, the unlocked-state maintaining structure includes hook structures respectively arranged on the first locking member and the second locking member and configured to be hooked to each other, and the switching member is further provided with an unhooking structure configured to push the second locking member.

Further, the unhooking structure is a lug or a side edge arranged on the switching member, and the lug or the side edge is configured to make contact with a side edge or a lug on the second locking member.

Further, contact edges at two sides of the locking block and contact surfaces at two sides of the locking groove are in wedge surface contact, and the second locking member is provided, on a side where the second locking member abuts against the first locking member, with a continuous maintaining edge configured to be in sliding contact with the first locking member.

Further, the locking control system includes a motor configured to control swinging of the switching member.

Further, the motor and the switching member are separately arranged, an output end of the motor is connected to a control block performing a rotational movement, and one point on a rotation circumference of the control block is connected to a non-hinged point of the switching member via a control wire.

Further, the locking control system further includes a rotation speed sensor configured to monitor the rotary output member, and the rotation speed sensor is in signal connection with the motor.

A lock applying the rotary locking mechanism described above is further disclosed according to the present application. The rotary output member is fixedly connected to a rotary transmission member connected to a wheel and is coaxial with the rotary transmission member, and the first locking member, the second locking member and the switching member are mounted on a same mounting base.

Further, the lock is arranged in a hub of the wheel of a bicycle, an electric vehicle or a motorcycle.

Further, the rotary locking mechanism is enclosed in a shell of the hub, the rotary output member is an annular member, and is inlaid and fixed to an inner wall or an inner end surface of the hub, and the locking grooves are provided in an inner wall or an end surface of the rotary output member; and the mounting base is locked and fixed to an axle, and is provided with rotary sleeves configured to be hinged to the first locking member, the second locking member and the switching member respectively, a positioning structure configured to mount the motor and a position-limiting structure configured to limit a control wire.

Further, the rotation speed sensor is a Hall sensor, the Hall sensor is fixed to a mounting seat, and the rotary output member is provided with a magnet steel which is aligned with a position where the Hall sensor is located.

Further, the motor is connected to a signal receiving module, and the motor is automatically controlled by a wired signal transmission or a wireless signal transmission.

A locking control method for the lock is further provided according to the present application, includes:

in a locked state, the locking block of the first locking member being completely engaged in the locking groove of the rotary output member, and meanwhile the second locking member and the first locking member abutting against each other, to reliably lock a wheel;

in an unlock process, controlling the switching member to swing by a rotation of a motor, first pushing the second locking member by the first unlocking structure of the switching member to release a locking constraint applied by the second locking member on the first locking member, then pushing the first locking member by the second unlocking structure of the switching member to push the locking block of the first locking member out of the locking groove, to finish the unlocking process;

in an unlocked state, the locking block of the first locking member being completely disengaged from the locking groove of the rotary output member, and meanwhile the second locking member and the first locking member fixing and constraining the first locking member through an unlocked-state maintaining structure; and in a locking process, controlling the switching member to swing back by a reverse rotation of the motor, pushing the second locking member by an unhooking structure of the switching member while releasing constraint on the first locking member by the switching member, and meanwhile releasing the unlocking constraint applied by the second locking member on the first locking member, wherein, at this time, the first locking member swings back under the action of its own torsion spring, to allow the locking block to be engaged in the locking groove of the rotary output member, and finally, the second locking member again abuts against the first locking member, to finish the locking process.

Further, the locking control method includes: in the unlocking process, setting a delay between the switching member pushing the second locking member and the switching member pushing the first locking member; wherein, a duration of the delay is longer than a duration for the locking corner and the locking indentation between the first locking member and the second locking member to be completely separated from each other.

In the locking control method of the present application, a protective rotation speed is set; in a case that the rotation speed of the wheel is lower than the protective rotation speed, the motor controls the locking mechanism to unlock or lock; and in a case that the rotation speed of the wheel is higher than the protective rotation speed, the motor is de-energized such that the motor does not receive a control signal and the locking mechanism is in a failed state; or, the control signal is maintained and in a case that the rotation speed of the wheel is lower than the protective rotation speed, the control signal re-controls the motor.

The present application has the following beneficial effects. The two locking members in the present application adopt a stable triangular supporting structure to lock the rotary output member, and the effective constraint applied by the second locking member on the first locking member in both the locked state and the unlocked state achieves the locking and unlocking reliability of the product.

In the present application, since the same switching member is used to control the entire locking mechanism, the control process is more compact and effective.

By adopting the wedge surface cooperation between the locking block of the first locking member and the locking groove and by providing the maintaining edge on the second locking member, the present application avoids the damage to the structure of the product caused by the false locking operation in high speed operation as well as the potential safety hazard of sudden stop through the mechanical mechanism. Moreover, in the automatic control method, a safe rotation speed of the locking control is set, to effectively prevent the false operation on the product through control method.

In the present application, the entire locking mechanism can be enclosed and fixed in the shell of the lock, and is easy to be combined with a rotary connector. The product can be applied to the transmission machineries of bicycles, electric vehicles, motorcycles and even light-weight automobiles, and has a wide range of application.

Each of the parts of the present application has a simple structure and can be formed by pressing and has a low cost.

In the present application, the automatic control of the locking mechanism can be connected to a wireless network to realize the external automatic control of locking and unlocking, which is favorable for popularizing the present application in the public transportation rental industry.

The present application can also be integrated with a power generator inside a hub, integrated with a GPS or Bluetooth module and the like, integrated with an internal transmission, and integrated in various other flexible integrating and assembling manners. The present application is further described below with reference to the drawings and embodiments.

Reference Numerals in FIGS. 1 to 18:
1 rotary output member,
101 locking groove,
102 locking groove contact surface;
2 first locking member,
201 locking block,
202 locking corner,
203 second unlocking edge,
204 first unlocked-state maintaining hook,
205 locking-block contact edge,
206 first locking member hinge hole,
21 first torsion spring,
22 first sleeve;
3 second locking member,
301 locking indentation,
302 first unlocking block,
303 second unlocked-state maintaining hook,
304 maintaining edge,
305 second locking member hinge hole,
31 second torsion spring,
32 second sleeve;
4 switching member,
401 first unlocking edge,
402 second unlocking block,
403 unhooking edge,
404 switching member hinge hole,
405 first control wire connection hole;
5 mounting base,
501 axle mounting hole,
502 first locking member mounting post,
503 second locking member mounting post,
504 motor mounting position-limiting protrusion,
505 sensor mounting post,
506 wire position-limiting post;
6 motor,
61 control block,
611 motor shaft mounting hole,
612 second control wire connection hole;
62 control wire;
71 Hall sensor,
72 magnet steel,
73 sensor mounting seat;
8 bicycle axle;
9 hub.

DETAILED DESCRIPTION

First Embodiment

Figure 1:
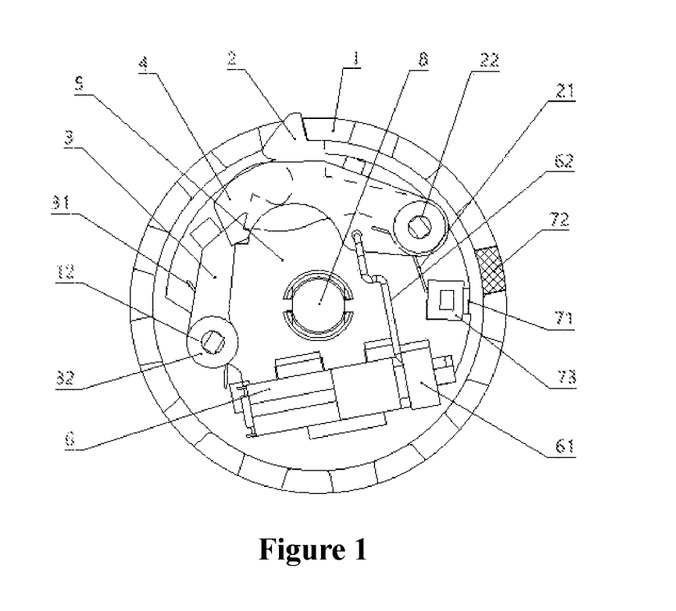
FIG. 1 is a schematic view showing the structure of a lock using a rotary locking mechanism according to a first embodiment of the present application.
Figure 2:
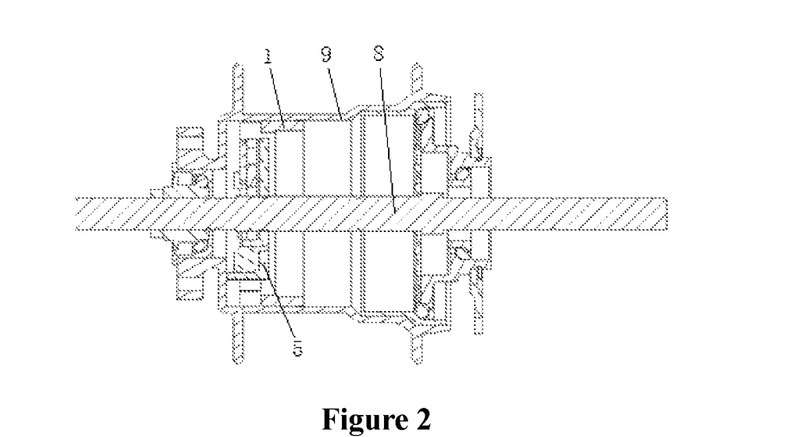
FIG. 2 is a front sectional view of the mechanical locking mechanism according to the first embodiment which is inside a bicycle hub.

Referring to FIGS. 1 and 2, a bicycle lock illustrated in the drawings is a preferred embodiment of the present application. The bicycle lock adopts a rotary locking mechanism according to the present application to lock and unlock a hub 9 of a bicycle, to achieve the lock function of the bicycle.

The rotary locking mechanism includes a rotary output member 1, a first locking member 2, a second locking member 3, a switching member 4, a mounting base 5, a motor 6 and other components.

The rotary output member 1, as a to-be-locked object between a rotary moving member and the locking mechanism, is fixedly connected to the rotary moving member required to be locked and is coaxial with the rotary moving member. The rotary moving member in this embodiment is a hub 9 of a bicycle, and the hub is a rotary connection member for connecting a bicycle axle to spokes of a bicycle wheel. The rotation power of the bicycle is transmitted to the hub 9 and is transmitted to the wheel through the hub 9 to achieve the rotation of the wheel.

Figure 3:
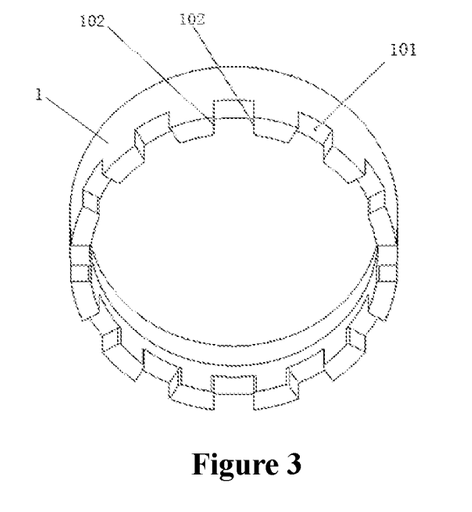
FIG. 3 is a schematic view of a rotary output member in the first embodiment.

Referring to FIGS. 1 and 3, the rotary output member 1 adopts an annular rotary structure. A circumference of the rotary output member 1 is inlaid and fixed to an inner wall of the hub 9, and the rotary output member 1 can be installed on the inner wall of the hub 9 by a circumferential positioning structure such as a spline connection structure, and the rotary output member 1 rotates together with the hub 9. The rotary output member 1 is provided with several locking grooves 101 which are distributed in the rotation circumference of the rotary output member 1 and can be arranged in an outer circumference and an inner circumference of the rotary output member of the annular structure. The locking grooves 101 are configured to cooperate with a reliable locking structure formed by the first locking member 2 and the second locking member 3, to lock the rotary output member 1 and the hub together.

Figure 4:
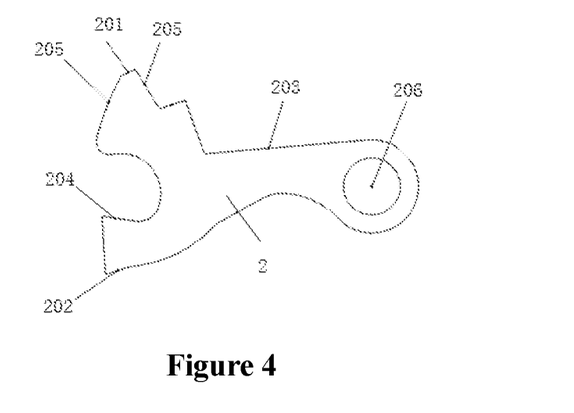
FIG. 4 is a schematic view of a first locking member in the first embodiment.
Figure 5:
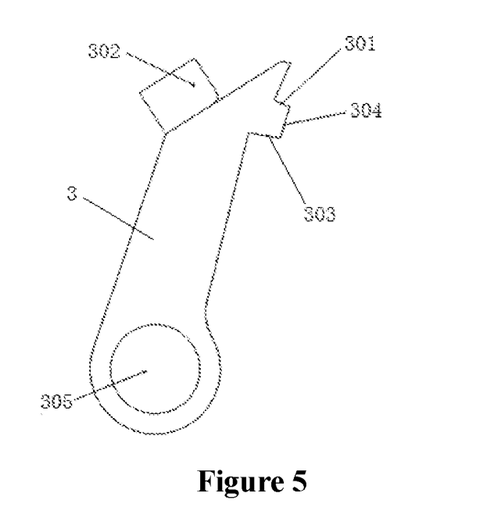
FIG. 5 is a schematic view of a second locking member in the first embodiment.

Referring to FIGS. 1, 4 and 5, the first locking member 2 and the second locking member 3 are two swinging rod members. Swing center points of the two locking members are elastically hinged at two hinge points respectively. The elastic hinging refers to that a torsion spring or a tension spring is provided at the hinge point of the first locking member or the hinge point of the second locking member, and the elastic force of the spring allows each of the two locking members to have an elastic resilient force around its hinge point. The first locking member 2 is provided with a locking block 201 configured to be engaged in the locking groove 101, and the second locking member 3 and the first locking member 2 abut against each other at a point outside a straight line in which the two hinge points are located. When the locking block of the first locking member 2 is engaged in the locking groove, the second locking member 3, under the action of its elastic resilient force, fixedly abuts against the first locking member 2, that is, the two hinge points of the first locking member 2 and the second locking member 3 and the abutting point between the first locking member 2 and the second locking member 3 may form a triangle. The first locking member 2 and the second locking member 3 are supported by the triangle, to allow the locking block of the first locking member 2 to be engaged into the locking groove 101 reliably, thereby reliably locking the rotary output member 1.

The first locking member 2 and the second locking member 3 are effectively abutted against each other through mutually engaged structures. A locking corner 202 is provided at an abutting position of the first locking member 2, and a locking indentation 301 is provided at an abutting position of the second locking member 3. The locking corner 202 and the locking indentation 301 are reliably engaged and fixed with respect to each other when the two locking members abut against each other. The angle of the locking corner and the opening direction of the locking indentation should be set to ensure that the first locking member and the second locking member can be separated from each other smoothly when they swing reversely. The positions of the locking corner and the locking indentation can be exchanged between the two locking members.

Figure 6:
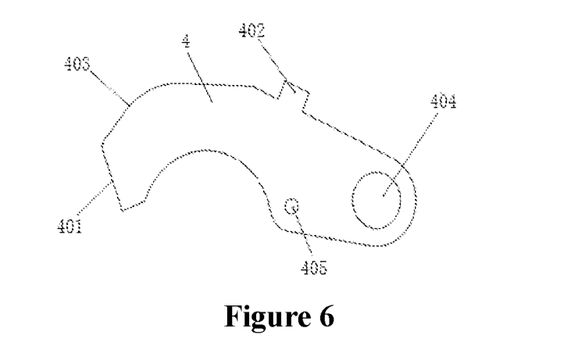
FIG. 6 is a schematic view of a switching member in the first embodiment.

The unlocking of the first locking member 2 and the second locking member 3 is achieved by the switching member 4. Referring to FIGS. 1 and 6, the switching member 4 is also a swinging rod member, which has one hinged end and has unlocking structures arranged on portions other than the hinge point and configured to sequentially push the second locking member 3 and the first locking member 2. The switching member 4 first reversely pushes the second locking member 3 aside to release the position constraint of the second locking member on the first locking member, and then pushes the first locking member 2 to disengage the locking block 201 of the first locking member 2 from the locking groove 101 of the rotary output member 1, thereby realizing the unlocking.

In this embodiment, the first locking member 2, the second locking member 3 and the switching member 4 are each embodied as a plate-shaped plate member, and the first locking member 2 and the second locking member 3 abut against each other to be locked in the same plane, and the switching member 4 is arranged in parallel with the plane in which the two locking members abut against each other. The switching member 4 is provided with a first unlocking edge 401 configured to push the second locking member 3 in an unlocking direction and a second unlocking block 402 configured to push the first locking member 2 in the unlocking direction, and correspondingly, the second locking member 3 is provided with a first unlocking block 302 configured to make contact with the first unlocking edge 401, and the first locking member 2 is provided with a second unlocking edge 203 configured to make contact with the second unlocking block 402. In practical applications, the positions of the unlocking blocks and the unlocking edges can be exchanged between the switching member and the two locking members. The two locking blocks are both arranged to protrude from the surfaces of the respective plate members, and the unlocking edges push the corresponding unlocking blocks or the unlocking blocks push the corresponding unlocking edges to achieve swinging of the corresponding locking members.

After the first locking member 2 and the second locking member 3 are unlocked, the switching member 4 can maintain the unlocked state of the two locking members. Preferably, in this embodiment, the first locking member 2 and the second locking member 3 are further provided with mutually hooked hook structures functioning as unlocked-state maintaining structures. The hook structures specifically include a first unlocked-state maintaining hook 204 arranged on the first locking member 2 and a second unlocked-state maintaining hook 303 arranged on the second locking member 3. After the second unlocking block 402 of the switching member 4 pushes the first locking member 2 into the unlocked state, the first unlocking block 302 of the second locking member 3 is separated from the first unlocking edge 401 of the switching member 4, and the second locking member 3 swings back by a certain angle under the action of its own elastic resilient force. At this time, the second unlocked-state maintaining hook 303 of the second locking member 3 and the first unlocked-state maintaining hook 204 of the first locking member 2 are hooked, and at this time, the second locking member 3 establishes a constraint on the first locking member 2 again, to prevent the first locking member 2 from swinging back. The provision of the unlocked-state maintaining structures can avoid false locking caused by back swinging of the first locking member 2 when a locking control system connected to the switching member 4 fails.

The switching member 4 is further provided with an unhooking structure configured to separate the hooked hook structures between the first locking member 2 and the second locking member 3 in the unlocked state, to realize the locking operation on the locking mechanism. Specifically, another side edge of the switching member 4 functions as an unhooking edge 403. The unhooking edge 403 functions similarly as the first unlocking edge 401 and is configured to push the first unlocking block 302 of the second locking member 3 from another direction (if the second locking member 3 is provided with an unlocking edge, the switching member is provided with a protruding unhooking block), to release the constraint of the second locking member 3 on the first locking member 2 through the hook structure. In this case, the first locking member 2 swings back under the action of its own elastic resilient force till the locking block 201 of the second locking member 2 is re-engaged in the locking groove 101 of the rotary output member 1. Then the switching member continues swings, the unhooking edge 403 is separated from the first unlocking block 302 of the second locking member 3, and at this time, under the action of the own elastic resilient force of the second locking member 3, the locking indentation 301 of the second locking member 3 again comes into engagement of the locking corner 202 of the first locking member 2 by abutting against the locking corner 202, thus, the locking process is completed.

In this embodiment, locking-block contact edges 205 at two sides of the locking block 201 of the first locking member 2 and locking-groove contact surfaces 102 at two sides of the locking groove 101 of the rotary output member 1 are arranged to be in wedge surface contact. The contact portions of the locking block and the locking groove can be machined into beveled planes or beveled edges to enable a wedge surface contact, or the installation angle between the locking block and the locking groove is set to enable a wedge surface contact. Without the constraint of the second locking member 3, no matter in what direction the rotary output member 1 rotates, the locking-groove contact surface 102 can push the locking block 201 together with the first locking member 2 out of the locking groove by the wedge surface cooperation, and the second locking member 3 can reliably confine the locking block in the locking groove after establishing a constraint on the first locking member 2 by the triangle support, thus the rotary output member can be locked in both forward and backward directions. Correspondingly, the second locking member 3 is provided with a continuous maintaining edge 304 at one side of the locking indentation 301, and in the unlocking process, for example, when the locking block 201 of the first locking member 2 is not fully engaged into the locking groove 101, the locking corner 202 of the first locking member 2 is always in sliding contact with the continuous maintaining edge 304 of the second locking member 3 in the process from the locking block just entering the locking groove to the locking block fully arriving at a limit position in the locking groove.

The purpose of the above arrangement is to ensure that the bicycle lock according to this embodiment will not falsely operate when the bicycle wheels are in a high speed rotation (such as during riding). In the process that the wheel rotates at a high speed, the wheel drives the rotary output member 1 to rotate at a high speed. In this case, if the locking mechanism is controlled to perform a locking operation, the locking block of the first locking member 2, after partially entering the locking groove 101 of the rotary output member 1, will be repeatedly pushed out together with the first locking member by the rotating locking grooves, and at this time, the locking corner 202 of the first locking member 2 slides reciprocally on the continuous maintaining edge 304 of the second locking member 3. The second locking member 3 will not establish an effective constraint on the first locking member 2. At this time, the locking mechanism will make continuous click impact noise (caused by the locking grooves repeatedly pushing out the locking block) to remind the rider that a false locking operation has occurred, and will apply a resistance on the rotary output member, that is, on the wheel, to reduce the speed. With such an arrangement, damages to the locking mechanism or the internal structure of the hub caused by locking in a high speed rotation can be avoided, thus effectively avoiding accidents during the riding due to false locking.

The switching member 4 in this embodiment may be coaxially hinged to the first locking member 2, and the switching member 4 is connected to the locking control system. The locking control system may be controlled manually, that is, being controlled manually by a cable system on the bicycle, and may also controlled electrically, to drive the switching member 4 to swing by the motor 6.

Figure 8:
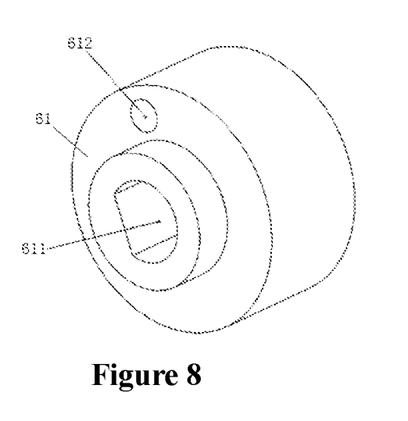
FIG. 8 is a schematic view of a control block in the first embodiment.

The motor 6 can be directly connected to a swinging shaft of the switching member 4, and the switching member is driven to reciprocally swing by forward and backward rotation of the motor. Alternatively, as shown in this embodiment, an output end of the motor 6 is connected to a control block 61, and as shown in FIG. 8, the control block 61 is provided with a non-circular motor shaft mounting hole 611 which is connected to an output shaft of the motor 6 to drive the control block 61 to perform a rotary motion. A second control wire connection hole 612 is provided in a rotation circumference of the control block 61, and is fixedly connected to one end of a control wire 62. A first control wire connection hole 405 is provided at a non-hinged point of the switching member 4 and is fixedly connected to another end of the control wire 62. The control block 61 rotates by a certain angle to drive the switching member 4 to swing by a certain angle through the control wire 61, and the motor is controlled to rotate forward or backward, to control the swinging direction of the switching member 4.

The control wire 62 should have a sufficient rigidity to be able to pull and push the switching member 4 to swing.

The motor 6 may be provided with a signal transmission module to achieve the automatic control to the motor through a wired signal or a wireless signal. The control mode of the motor 6 may also be set as a cellphone APP control mode applicable to network automatic rental of public bicycles. Controlling a motor by a wired signal or a wireless signal belongs to the commonly used motor control technology, and the person skilled in the art can choose and design the detailed control manner according to practical requirements, which will not be described in this embodiment.

In this embodiment, the mechanical false operation prevention structures are provided on the locking groove 101 of the rotary output member 1, the locking block 201 of the first locking member 2, and the second locking member 3, and on the basis of electrically controlling the locking operation, this embodiment also adopts an automatic false operation prevention arrangement.

Specifically, the locking control system according to this embodiment further includes a rotation speed sensor, and the rotation speed sensor is in signal connection with the motor. The rotation speed sensor in this embodiment is embodied as a Hall sensor 71 to measure the rotation speed. A magnet steel 72 is fixedly arranged on the rotary output member 1 or a rotation circumference of a rotary member connected to the rotary output member 1, and then the Hall sensor 71 is fixedly arranged by a sensor mounting seat 73 to face the magnet steel. Once the rotary output member 1 or the rotary member connected to the rotary output member 1 rotates one turn, the Hall sensor receives one signal, and the rotation is counted by one turn, and then the rotation speed at this time is calculated. Moreover, a protective rotation speed is set in the system. When the rotation speed detected by the Hall sensor exceeds the protective rotation speed, the channel for the motor to communicate with the external signal is cut off to allow the motor to stop performing any operation, or the control signal is maintained to allow the motor to perform an operation instruction when the speed is lower than the protective rotation speed, and thus when the rotation speed detected by the Hall sensor is lower than the protective rotation speed, the motor can perform a corresponding locking action according to an external signal. In this way, the false operation can be effectively prevented both electronically and mechanically, thus improving the reliability and safety of the locking structure.

The rotation speed sensor may also function as a speed monitoring module of the bicycle, which receives and displays the riding speed in real time by a mobile display module.

In this embodiment, the rotary output member 1 is fixedly connected to the inner wall of the hub 9 of the bicycle wheel. The first locking member 2, the second locking member 3, the switching member 4 and the motor 6 are all arranged on the same mounting base 5. The mounting base 5 is fixedly connected to a bicycle axle 8 corresponding to the hub, and thus the entire locking mechanism is enclosed in a shell of the hub of the bicycle.

Figure 7:
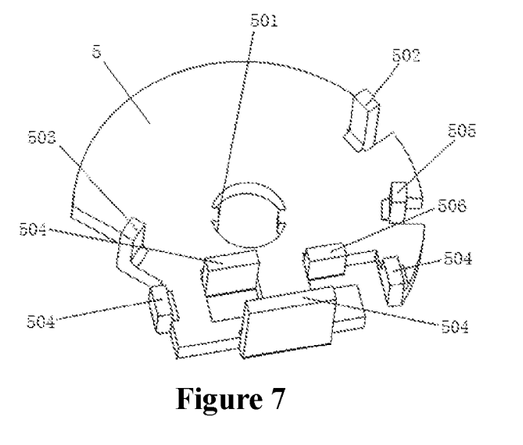
FIG. 7 is a schematic view of a mounting base in the first embodiment.

As shown in FIG. 7, the mounting base 5 can be embodied as a stamped plate, an axle mounting hole 501 is provided in the center of the mounting base 5 and is configured to fit with the outer circumference of the bicycle axle 8. An inner side of the axle mounting hole 501 is provided with two protrusions which cooperate with two grooves provided in the bicycle axle 8. The axially positioning between the mounting base 5 and the bicycle axle 8 can be achieved by a retaining ring or other positioning elements on the axle, to fixedly install the mounting base 5 to the bicycle axle 8. A first locking member mounting post 502 configured to mount the first locking member 2, a second locking member mounting post 503 configured to mount the second locking member 3, several motor mounting position-limiting protrusions 504 configured to position and mount the motor 6, and a sensor mounting post 505 configured to mount the rotation speed sensor are distributed along the periphery of the mounting base 5.

The mounting base 5 is further provided with a control wire position-limiting post 506, and the control wire 62 moves above the control wire position-limiting post 506. The control wire 62 abuts against the control wire position-limiting post 506 when the switching member 4 is controlled by the control wire 62 to reach two limit positions, thereby realizing the precise positioning of the switching member 4 at the two limit positions.

Referring to FIGS. 1 and 4, the first locking member 2 is provided with a first locking member hinge hole 206, and the first locking member 2 is rotatably assembled to the first locking member mounting post 502 through a first sleeve 22. A first torsion spring 21 is installed between the first locking member 2 and the first sleeve 22, to achieve an elastic hinged connection of the first locking member 2. The restoring direction of the first torsion spring 21 is a direction in which the locking block of the first locking member is engaged into the locking groove.

Referring to FIGS. 1 and 5, the second locking member 3 is provided with a second locking member hinge hole 305, and the second locking member 3 is rotatably assembled to the second locking member mounting post 503 through a second sleeve 32. A second torsion spring 31 is mounted between the second locking member 3 and the second sleeve 32, to achieve the elastic hinged connection of the second locking member 3. The restoring direction of the second torsion spring 31 is the same as the restoring direction of the first torsion spring. In a locked state, the second locking member 3 can reliably abut against the first locking member by the resilient force of the second torsion spring 31.

Referring to FIGS. 1 and 6, the switching member 4 is provided with a switching member hinge hole 404, and the switching member 4 and the first locking member 2 are coaxially hinged. The switching member 4 is rotatably assembled to the first locking member mounting post 502 through the first sleeve 21, and moreover, a first control wire connection hole 405 is provided at a lower part of the switching member 4 and the control wire is fixedly hooked in the first control wire connection hole 405.

As shown in FIG. 1, the Hall sensor 71 as the rotation speed sensor is fixed to the sensor mounting post 505 by the sensor mounting seat 73. The magnet steel 72 corresponding to the Hall sensor 71 is fixedly inlaid on the rotation circumference of the rotary output member, to be aligned with a receiving side of the Hall sensor.

The operation process of the lock according to this embodiment is described in detail hereinafter with reference to FIGS. 1 and 9 to 14.

Figure 9:
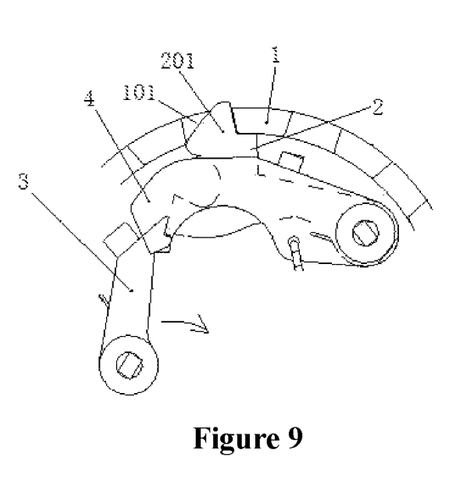
FIG. 9 is a schematic view showing a locked state of the first locking member and the second locking member in the first embodiment.

As shown in FIGS. 1 and 9, in a locked state of the lock, the bicycle is stopped at this time, the rotation speed of the wheel is zero, and the rotary output member 1 does not rotate in either a forward direction or a reverse direction. The first locking member 2 has the locking block 201 engaged into the locking groove 101 of the rotary output member 1 under the action of the resilient force of the first torsion spring 21, meanwhile, the second locking member 3 is abutted against the first locking member 2 under the action of the resilient force of the second torsion spring 31. The locking corner 202 and the locking indentation 301, at the position where the second locking member 3 and the first locking member 2 abut against each other, are fixedly coupled to allow a stable triangular supporting structure to be formed between the first locking member 2 and the second locking member 3, to form locking to the rotary output member 1 and the wheel hub connected to the rotary output member 1. Thus, the second locking member 3 establishes a constraint on the first locking member 2, to prevent the locking block 201 of the first locking member 2 from being disengaged from the locking groove 101.

Figure 10:
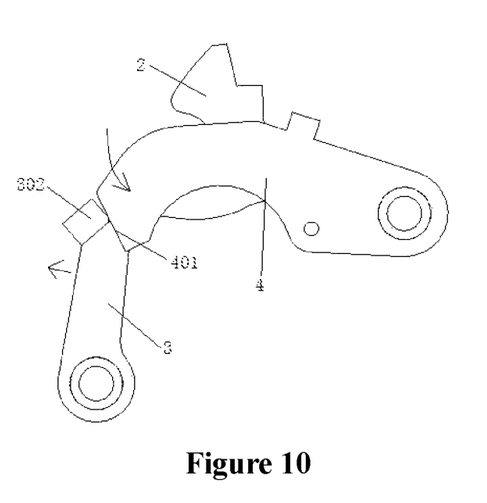
FIG. 10 is a schematic view showing the switching member performing an unlocking operation in the first embodiment.
Figure 11:
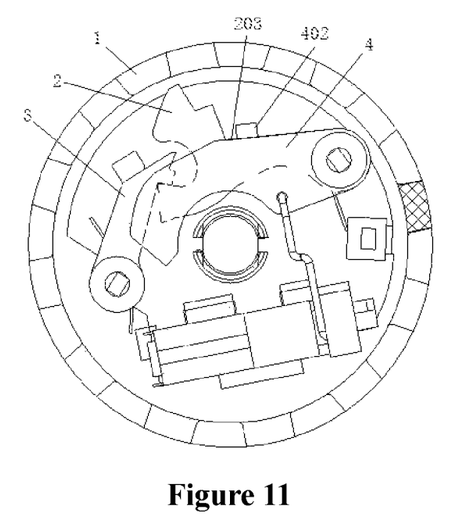
FIG. 11 is a schematic view showing an unlocked state of the lock in the first embodiment.

As shown in FIGS. 10 and 11, in the unlocking process, the switching member 4 is driven by the locking control system (embodied as the motor and the control wire in this embodiment) to swing counterclockwise. The first unlocking edge 401 of the switching member 4 firstly comes into contact with the first unlocking block 302 of the second locking member 3. As the switching member 4 continues swinging, the first unlocking edge 401 pushes the first unlocking block 302 to allow the second locking member 3 to swing counterclockwise against its own resilient force. After the second locking member 3 swings to a certain angle, the locking indentation 301 and the lock corner 202 abutting against each other and coupled with each other between the second locking member 3 and the first locking member 2 are separated. At this time, the second unlocking block 402 arranged at an upper part of the switching member 4 comes into contact with the second unlocking edge 203 at an upper part of the first locking member 2. As the switching member continues swinging, the second unlocking block 402 pushes the second unlocking edge 203, to allow the first locking member 2 to rotate counterclockwise against its own resilient force, to further allow the locking block 201 of the first locking member 2 to be disengaged from the locking groove 101, and thus, the unlocking process is completed.

Figure 12:
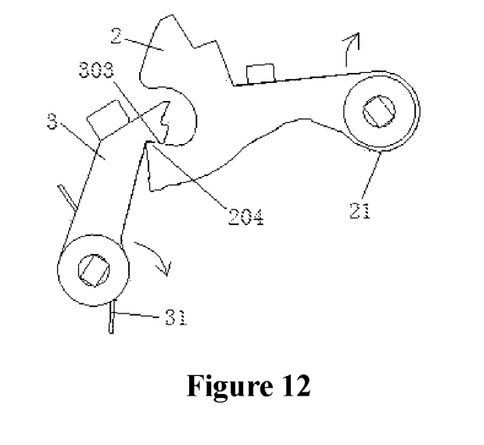
FIG. 12 is a schematic view of the first locking member and the second locking member in the first embodiment which are maintained an unlocked state.

As shown in FIG. 12, after the locking block 201 of the first locking member 2 is fully disengaged from the locking groove 101, the first unlocking block 302 of the second locking member 3 is released from the constraint applied by the switching member 4 and springs back. The second unlocked-state maintaining hook 303 arranged on the second locking member 3 is hooked to the first unlocked-state maintaining hook 204 of the first locking member 2. At this moment, the second locking member 3 re-establishes a constraint on the first locking member 2, to prevent the first locking member 2 from engaging the locking block into the locking groove by mistake under the action of its own resilient force. Furthermore, the switching member can be maintained in its position under the action of the locking control system.

Figure 13:
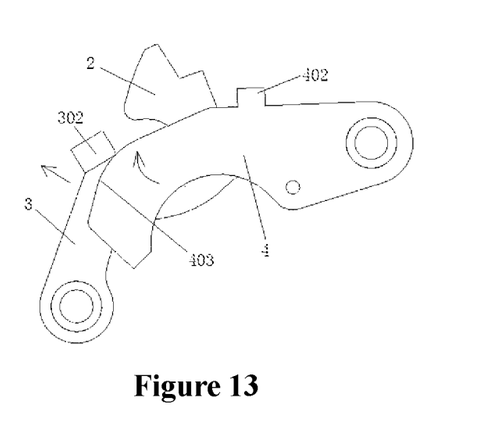
FIG. 13 is a schematic view showing the switching member performing an unhooking operation in the first embodiment.

As shown in FIG. 13, when to release the unlocked state and relock the locking mechanism, the switching member 4 is driven by the locking control system to swing back clockwise. At this time, the unhooking edge 403 arranged at the upper part of the switching member 4 comes into contact with the first unlocking block 302 of the second locking member 3 in another direction. As the switching member 4 continues swinging back, the unhooking edge 403 pushes the first unlocking block 302, to allow the second locking member 3 to swing counterclockwise against its own resilient force, to allow the second unlocked-state maintaining hook and the first unlocked-state maintaining hook, which are hooked between the second locking member 3 and the first locking member 2, to be disengaged from each other. After the second unlocked-state maintaining hook and the first unlocked-state maintaining hook are separated from each other, the first locking member 2 is released from the constraint applied by the second locking member 3, and the first locking member 2 is re-engaged into the locking groove 101 of the rotary output member 1 under the action of the resilient force of the first locking member 2 and the restoring effect of the second unlocking block 402 of the switching member 4.

Figure 14:
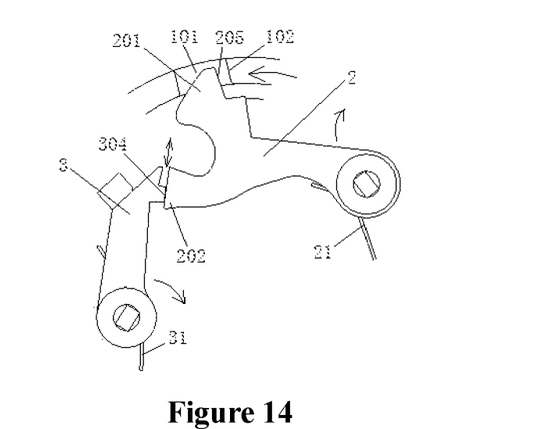
FIG. 14 is a schematic view showing a maintaining state of the lock in the first embodiment in a high speed rotation.

As shown in FIG. 14, for example, in the locking process, the bicycle wheel is in a high-speed rotation state (locking during riding due to false operation). When the locking block 201 of the first locking member 2 just starts to enter the locking groove 101 of the rotary output member 1, the locking-groove contact surfaces at two sides of the locking groove 101 and locking-block contact edges 205 of the locking block 201 are in wedge surface cooperation, and at the same time, the locking corner 202 of the first locking member 2 is in contact with the maintaining edge 304 of the second locking member 3. At this time, during the high speed rotation of the rotary output member, the second locking member 3 does not have enough time to establish an effective constraint on the first locking member 2, and the wedge surface cooperation between the locking groove 101 and the locking block 201 may constantly push the locking block 201 together with the first locking member 2 out of the locking grooves in which the locking block enters, and meanwhile, the locking corner 202 of the first locking member 2 slides back and forth with respect to the maintaining edge 304 of the second locking member 3, to ensure that the bicycle cannot be reliably locked during riding. After the wheel stops rotating, the rotary output member 1 stops rotating, at this time, the locking block 201 of the first locking member 2 can be fully engaged into one of the locking grooves 101, and at this time, the locking indentation 301 of the second locking member 3 and the locking corner 202 of the first locking member 2 are coupled with each other, as shown in FIG. 9, and thus, the reliable locking is realized.

In this embodiment, the following control method may be adopted when the locking mechanism is automatically controlled by a motor to perform the locking and unlocking operations.

In a locked state, the locking block of the first locking member is fully engaged in the locking groove of the rotary output member, and at the same time, the second locking member abuts against the first locking member to achieve a reliable locking of the wheel.

In the unlock process, the motor rotates to control the switching member to swing. The first unlocking structure of the switching member first pushes the second locking member to release the locking constraint on the first locking member applied by the second locking member, and then the second unlocking structure of the switching member pushes the first locking member, to push the locking block of the first locking member out of the locking groove, and thus, the unlocking process is completed.

In the unlocking process, it is required to set a delay between the switching member pushing the second locking member and the switching member pushing the first locking member. That is, the action of the first unlocking edge 401 pushing the first unlocking block 302 in FIG. 10 and the action of the second unlocking block 402 pushing the second unlocking edge 203 in FIG. 11 are not simultaneous. The second unlocking block 402 is configured to push the second unlocking edge 203 only after the first unlocking edge 401 pushes the first unlocking block 302 to allow the locking corner and the locking indentation between the first locking member and the second locking member to be completely separated from each other, and thus jamming caused by an interference between the first locking member and the second locking member during the unlocking process can be avoided.

In the unlocked state, the locking block of the first locking member is completely disengaged from the locking groove of the rotary output member, meanwhile, the second locking member and the first locking member fix and constrain the first locking member by the unlocked-state maintaining mechanism.

In the locking process, the motor rotates reversely to control the switching member to swing back. While the switching member releases its constraint on the first locking member, the second locking member is pushed by the unlocking structure, and meanwhile, the unlocking constraint applied by the second locking member on the first locking member is released, at this time, the first locking member swings back under the action of its own torsion spring, and the locking block is engaged into the locking groove of the rotary output member, finally, and finally the second locking member again abuts against the first locking member, and thus, the locking process is completed.

In the above control flow, a protective speed is set. When the speed of the bicycle is lower than the protective speed, the motor can control the locking mechanism to unlock or lock. When the speed of the bicycle is higher than the protective speed, the motor is de-energized so that the motor no longer receives control signals, the locking mechanism is in a failed state. Thus, the false operation is prevented from both the mechanical mechanism aspect and the automatic control aspect.

Second Embodiment

Figure 15:
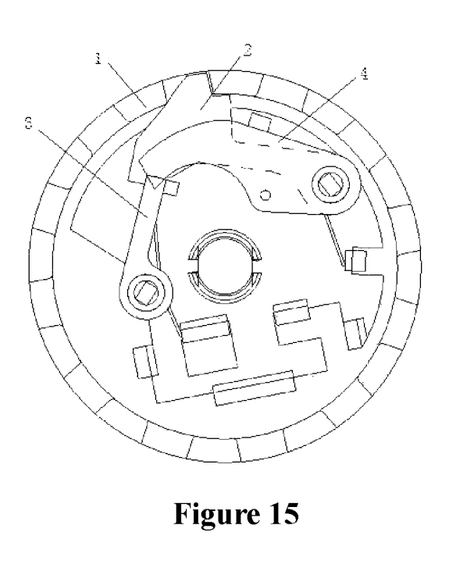
FIG. 15 is a schematic view showing a locked state of a lock in a second embodiment.
Figure 16:
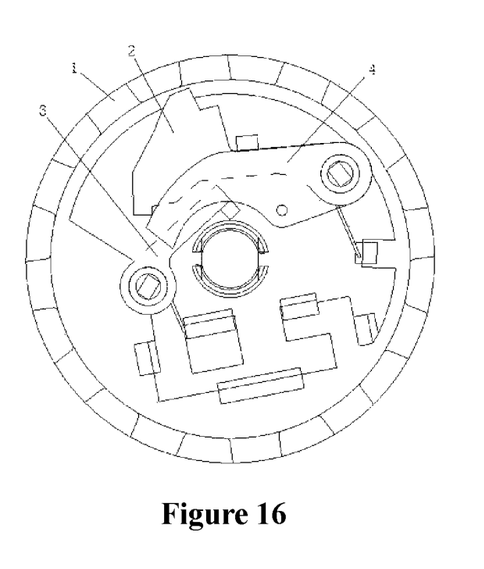
FIG. 16 is a schematic view showing an unlocked state of the lock in the second embodiment.

Reference is made to FIGS. 15 and 16. Unlike the first embodiment, in this embodiment, the first locking member 2 is provided with a locking indentation and the second locking member 3 is provided with a locking corner, and moreover, the restoring direction of the torsion spring of the second locking member 3 is opposite to that in the first embodiment, and, in the unlocking process, the switching member 4 pushes the second locking member 3 to continue swinging clockwise. This solution is also within the scope of protection defined by claims of the present application.

Third Embodiment

Figure 17:
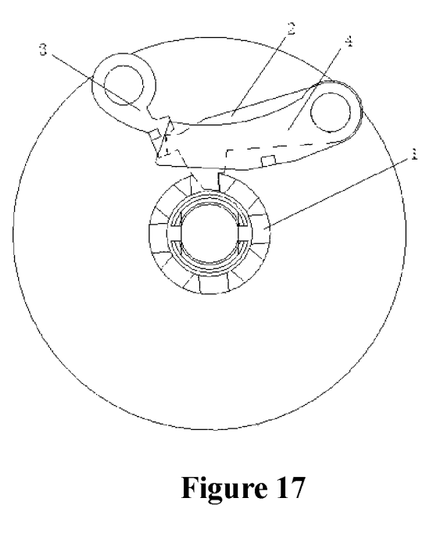
FIG. 17 is a schematic view showing a locked state of a lock in a third embodiment.
Figure 18:
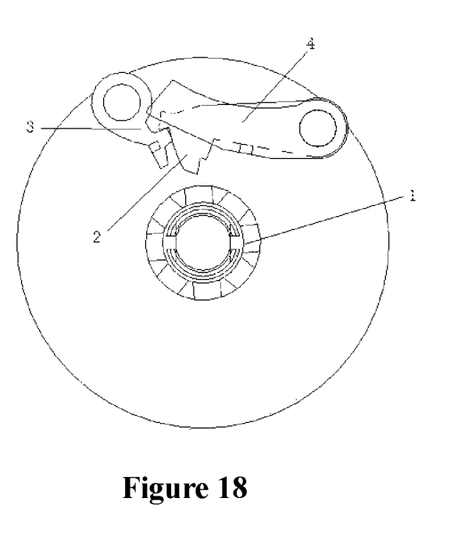
FIG. 18 is a schematic view showing an unlocked state of the lock in the third embodiment.

Reference is made to FIGS. 17 and 18. Unlike the first and second embodiments, in this embodiment, the rotary output member 1 is also coaxially fixedly connected to the hub, and the locking grooves 101 of the rotary output member 1 are arranged at the center of the shell of the hub and surround the axle of the bicycle, and the first locking member 2, the second locking member 3 and the switching member 4 are all arranged outside the circumference of the locking grooves 101. This solution is also within the scope of protection defined by claims of the present application.

The hub in the above three embodiments can be a bicycle hub with an internal transmission, may also be a single bicycle hub, a bicycle hub integrated with a generator, or a bicycle hub integrated with functional modules such as GPS or Bluetooth modules.

The rotary locking mechanism applied in the present application can also be applied to rotary moving members of other vehicles, including rotary motion transmission members of electric vehicles, motorcycles or automobiles and the like. The person skilled in the art can adopt various implementations similar to the above embodiments within the scope of the claims according to various rotary motion transmission members, which will not be listed here one by one.

What is claimed is:

1. A rotary locking mechanism, comprising: a rotary output member, a first locking member, a second locking member and a switching member, wherein
the rotary output member is connected to a rotary member to transmit rotation power, and a rotation circumference of the rotary output member is provided with a plurality of locking grooves;
the first locking member and the second locking member are respectively elastically hinged at two hinge points, the first locking member is provided with a locking block engageable in any one of the locking grooves, and the second locking member and the first locking member abut against each other at a position outside a straight line in which the two hinge points are located, to allow the locking block of the first locking member to be engaged into the locking groove; and
the switching member is connected to a locking control system and has a first unlocking structure and a second unlocking structure configured to sequentially push the second locking member and the first locking member respectively; and
the locking control system comprises a motor configured to control swinging of the switching member, wherein the motor and the switching member are separately arranged, an output end of the motor is connected to a control block performing a rotational movement, and one point on a rotation circumference of the control block is connected to a non-hinged point of the switching member via a control wire.

2. The rotary locking mechanism according to claim 1, wherein contact edges at two sides of the locking block and contact surfaces at two sides of the locking groove are in wedge surface contact, and the second locking member is provided, on a side where the second locking member abuts against the first locking member, with a continuous maintaining edge configured to be in sliding contact with the first locking member.

3. The rotary locking mechanism according to claim 1, wherein the locking control system further comprises a rotation speed sensor configured to monitor the rotary output member, and the rotation speed sensor is in signal connection with the motor.

4. The rotary locking mechanism according to claim 1, wherein the first locking member and the second locking member abut against each other through a locking corner and a locking indentation, and the locking corner and the locking indentation are cooperated with each other.

5. The rotary locking mechanism according to claim 1, wherein the first unlocking structure comprises a first unlocking edge configured to push the second locking member, the second unlocking structure comprises a second unlocking block configured to push the first locking member, the unlocking block is protruding, and the unlocking edge is configured to make contact with the unlocking block.

6. The rotary locking mechanism according to claim 5, wherein the first locking member and the second locking member are further provided with an unlocked-state maintaining structure.

7. The rotary locking mechanism according to claim 1, wherein the first locking member and the second locking member are further provided with an unlocked-state maintaining structure.

8. The rotary locking mechanism according to claim 7, wherein the unlocked-state maintaining structure comprises hook structures respectively arranged on the first locking member and the second locking member and configured to be hooked to each other, and the switching member is further provided with an unhooking structure configured to push the second locking member.

9. The rotary locking mechanism according to claim 8, wherein the unhooking structure is a lug or a side edge arranged on the switching member, and the lug or the side edge is configured to make contact with a side edge or a lug on the second locking member.

10. A lock applying the rotary locking mechanism according to claim 1, wherein the rotary output member is fixedly connected to the rotary member connected to a wheel and is coaxial with the rotary member, and the first locking member, the second locking member and the switching member are mounted on a same mounting base.

11. A locking control method for the lock according to claim 10, comprising:
in a locked state, the locking block of the first locking member being completely engaged in the locking groove of the rotary output member, and meanwhile the second locking member and the first locking member abut against each other, to reliably lock the wheel;
in an unlock process, controlling the switching member to swing by a rotation of the motor, first pushing the second locking member by the first unlocking structure of the switching member to release a locking constraint applied by the second locking member on the first locking member, then pushing the first locking member by the second unlocking structure of the switching member to push the locking block of the first locking member out of the locking groove, to finish the unlocking process;
in an unlocked state, the locking block of the first locking member being completely disengaged from the locking groove of the rotary output member, and meanwhile the second locking member and the first locking member fixing and constraining the first locking member through an unlocked-state maintaining structure; and
in a locking process, controlling the switching member to swing back by a reverse rotation of the motor, pushing the second locking member by an unhooking structure of the switching member while releasing constraint on the first locking member by the switching member, and meanwhile releasing the unlocking constraint applied by the second locking member on the first locking member, wherein, at this time, the first locking member swings back under the action of the torsion spring of the first locking member, to allow the locking block to be engaged in the locking groove of the rotary output member, and finally, the second locking member again abuts against the first locking member, to finish the locking process.

12. The locking control method for the lock according to claim 11, comprising:
setting a protective rotation speed,
in a case that a rotation speed of the wheel is lower than the protective rotation speed, controlling, by the motor, the rotary locking mechanism to unlock or lock;
in a case that the rotation speed of the wheel is higher than the protective rotation speed, stopping the motor from receiving a control signal and allowing the locking mechanism to be in an unlocked state, or maintaining the control signal and re-controlling the motor by the control signal in a case that the rotation speed of the wheel is lower than the protective rotation speed.

13. The lock according to claim 10, wherein the rotary member is a hub, and the lock is arranged in the hub of the wheel of a bicycle, an electric vehicle or a motorcycle.

14. The lock according to claim 13, wherein the rotary locking mechanism is enclosed in a shell of the hub, the rotary output member is an annular member, and is inlaid and fixed to an inner wall or an inner end surface of the hub, and the locking grooves are provided in an inner wall or an outer circumferential surface of the rotary output member; and the mounting base is locked and fixed to an axle, and is provided with rotary sleeves configured to be hinged to the first locking member, the second locking member and the switching member respectively, and the mounting base is further provided with a positioning structure configured to mount the motor and a position-limiting structure configured to limit the control wire.

15. The lock according to claim 14, wherein the rotation speed sensor is a Hall sensor, the Hall sensor is fixed to a mounting seat, and the rotary output member is provided with a magnetic steel which is aligned with a position where the Hall sensor is located.

16. The lock according to claim 15, wherein the motor is connected to a signal receiving module, and the motor is automatically controlled by a wired signal transmission or a wireless signal transmission.

* * * * *